United States Patent
Glass et al.

(10) Patent No.: US 11,388,559 B2
(45) Date of Patent: *Jul. 12, 2022

(54) SYSTEM AND METHOD FOR SUBSCRIPTION BASED DEPLOYMENT AND MANAGEMENT OF A COMMUNICATION SYSTEM

(71) Applicant: MOTOROLA SOLUTIONS, INC, Chicago, IL (US)

(72) Inventors: Stephen C. Glass, Plantation, FL (US); David Klein, Parkland, FL (US); Blake C. Moselle, Plantation, FL (US); John Touvannas, Kildeer, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/007,528

(22) Filed: Aug. 31, 2020

(65) Prior Publication Data
US 2020/0404461 A1    Dec. 24, 2020

Related U.S. Application Data

(63) Continuation of application No. 16/351,126, filed on Mar. 12, 2019, now Pat. No. 10,798,533.

(51) Int. Cl.
| | | |
|---|---|---|
| *H04W 4/10* | (2009.01) | |
| *H04W 4/60* | (2018.01) | |
| *H04W 4/80* | (2018.01) | |
| *H04L 12/66* | (2006.01) | |
| *H04W 4/24* | (2018.01) | |

(52) U.S. Cl.
CPC ............... *H04W 4/10* (2013.01); *H04L 12/66* (2013.01); *H04W 4/24* (2013.01); *H04W 4/60* (2018.02); *H04W 4/80* (2018.02)

(58) Field of Classification Search
None
See application file for complete search history.

(56) References Cited

U.S. PATENT DOCUMENTS

| | | |
|---|---|---|
| 6,298,043 B1 | 10/2001 | Mauger et al. |
| 92,320,077 | 1/2016 | Yu et al. |

(Continued)

FOREIGN PATENT DOCUMENTS

EP    2797302 A2    10/2014

*Primary Examiner* — Shripal K Khajuria
(74) *Attorney, Agent, or Firm* — Barbara R. Doutre

(57) ABSTRACT

An ordering system (102) generates subscription offerings and receives an order entry in response thereto, for configuring a plurality of mobile communication devices (116) and gateways. A service management system (106) having a service management controller processes the order entry and establishes subscription services in response thereto. The subscription services are based on one or more of features, bearer providers, and capabilities associated with the plurality of mobile communication devices and gateways. The service management system (106) manages the selection of optimal bearer providers as the gateways for the transport of features requested in the order. A billing service (120) is adjusted in accordance with deployment and management of the mobile communication devices, including the transfer of mission critical functions from narrowband bearer providers to broadband bearer providers.

17 Claims, 5 Drawing Sheets

(56) References Cited

U.S. PATENT DOCUMENTS

| | | | |
|---|---|---|---|
| 9,307,370 B1* | 4/2016 | Pai | H04W 76/16 |
| 9,692,878 B1 | 6/2017 | Rosenthal et al. | |
| 2002/0129371 A1* | 9/2002 | Emura | H04N 21/8453 |
| | | | 348/E7.071 |
| 2004/0131052 A1* | 7/2004 | Smith | H04Q 3/0025 |
| | | | 370/352 |
| 2006/0025073 A1 | 2/2006 | Benco et al. | |
| 2011/0066712 A1 | 3/2011 | Kumar et al. | |
| 2011/0176424 A1 | 7/2011 | Yang et al. | |
| 2013/0281077 A1 | 10/2013 | Zou et al. | |
| 2015/0078329 A1 | 3/2015 | Zhu et al. | |
| 2015/0105042 A1 | 4/2015 | Miller et al. | |
| 2017/0034587 A1 | 2/2017 | Garner | |
| 2017/0331708 A1 | 11/2017 | Memmott et al. | |

* cited by examiner

| FEATURE SUBSCRIPTION TYPE (202) | FEATURE ASSOCIATION (204) | EXAMPLE(S) | NEW ORDER (206) | ADD ORDER | RENEW ORDER | DROP (208) |
|---|---|---|---|---|---|---|
| DEVICE BASED | FEATURES TIED TO A SPECIFIC DEVICE | BACKUP PTT ••• | -DEPENDENT ON DEVICE -CUSTOMER ASSOCIATES WITH DEVICE | | | -SUBSCRIPTION EXPIRATION |
| USER BASED | FEATURES TIED TO A SPECIFIC USER | VIRTUAL ASSISTANT ••• | -INDEPENDENT OF DEVICE -CUSTOMER ASSOCIATES WITH USER | | | -SUBSCRIPTION EXPIRATION |

SYSTEM AND METHOD FOR SUBSCRIPTION BASED DEPLOYMENT AND MANAGEMENT OF A COMMUNICATION SYSTEM

FIELD OF THE INVENTION

The present invention relates generally to communication systems and more particularly to facilitating subscriptions that facilitate the deployment and management of converged communication devices.

BACKGROUND

In the past and even in many of today's communication environments, land mobile radios (LMR) have operated over a narrowband network for use in public safety environments, such as law enforcement, fire rescue, and the like, while smartphone devices, on the other hand, have operated over broadband networks for other business or consumer oriented applications. However, the expansion of broadband is reshaping the world of public safety. In situations where different organizations may desire to interoperate with each other, the larger availability of broadband frequencies, along with the applications supported by broadband, such as telephony, text, and video, imaging and multimedia applications, makes the idea of converging LMR features for operation within a broadband system an attractive approach to communication. The ability to use a broadband network as a back-up for LMR mission critical functionality is also highly desirable for cases in which the LMR narrowband system may become temporarily unavailable.

However, the desire to have public safety LMR features that will operate over broadband comes with many challenges. For example, the ability to appropriately prioritize public safety LMR features, such as public safety push-to-talk (PTT) and other applications related to public safety, face challenges associated with the fact that certain broadband operating systems prioritize telephony calls, over incoming public safety calls. From the user standpoint, there is a need, particularly for those users operating in public safety environments, to have quick access to a public safety features and functions. From a device and services standpoint, there is a need for service providers to manage feature subscriptions and billing across multiple different providers.

Accordingly, it would be desirable to facilitate deployment and management of a communications system formed of converged mobile communication devices, including management of service subscriptions, across LMR narrowband and broadband networks.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 is an example table for a subscription based communication system in accordance with some embodiments.

Figure 1:
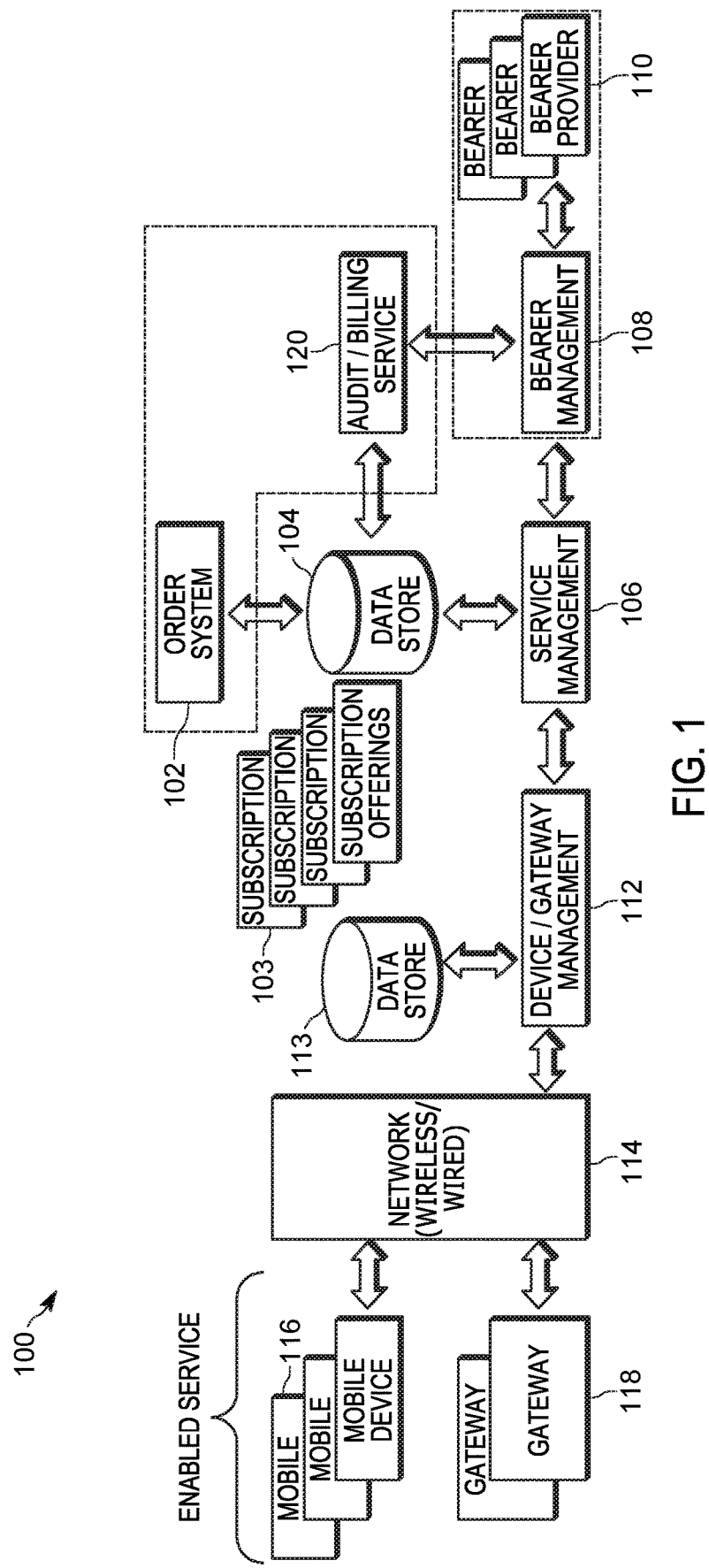
FIG. 1 is a block diagram of a communication system formed and operating in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is described herein a system and method for subscription based deployment and management of a communication system. For the purposes of this application, Land Mobile Radio (LMR), also called public land mobile radio or private land mobile radio, is a wireless communications system intended for use by terrestrial users in vehicles and/or on foot. Communication devices operating in such a system will generally be referred to by the term mobile communication devices. Examples are two way radios in vehicles or worn on the body. Such systems are used by emergency first responder organizations such as police, fire, and ambulance services, public works organizations, dispatched services such as taxis, or companies with the need for large fleet management. For the purposes of this application, LMR is considered a narrowband system which is further connected to other systems, those other systems being broadband systems, for example: cellular networks, such as Long Term Evolution (LTE), a wireless local area network system, such as WiFi, BLUETOOTH, personal area network (PAN), internet systems, and/or other broadband systems known or yet to be developed. The embodiments provided herein are directed to providing a communication system that enables subscription based deployment and fleet management of purposely built mobile communication devices.

FIG. 1 is a block diagram of a communication system 100 formed and operating in accordance with some embodiments. The communication system 100 comprises an ordering system 102, a data storage memory 104, a service management system 106, a bearer management system 108, a plurality of different bearer providers 110, and a device/gateway management system 112, all communicatively coupled (wirelessly, wired, or combination thereof) to a communications network 114 for subscription based deployment and management of services to a plurality of remote mobile communication devices 116 over one or more gateways 118. For the purposes of this application, the term 'services' encompasses features, bearer providers, and capabilities. Features are associated with a mobile device or a user, for example push-to-talk (PTT), device management, location, and virtual assistant, to name a few; bearer providers are associated with the system, for example LMR, LTE, WiFi, Bluetooth, 5G cellular to name a few; and capabilities are associated with measurable parameters of a bearer provider, for example quality of service (QoS) of a bearer provider, availability of a bearer provider, duration of time anticipated for use a bearer provider, number of calls to be processed by the bearer provider, data rate of a bearer provider, and time duration of calls processed through a bearer provider, to name a few.

In accordance with some embodiments, the ordering system 102 generates subscription offerings 103 and receives subscription orders from a customer for provisioning the plurality of remote mobile communication devices 116 and configuring the one or more gateways 118 in via communication network 114. The ordering system 102 may comprise for example, a dedicated order console, web based ordering portal, or other suitable order entry database. The subscription offerings and orders generated in response thereto comprise one or more of: device based subscriptions and/or user based subscriptions. Device based subscriptions offer services tied to one or more specific devices of the plurality of mobile devices 116 and required gateways 118. User based subscriptions offer services associated with a particular end user and required gateway 118. Further description of device based subscriptions and user based subscriptions will be provided later. In accordance with some embodiments, the subscription offerings define features, bearer type, and capabilities needed for a device and gateway, however the aspects of bearer type and capabilities remain transparent to the customer entering an order request as well as the end user utilizing the device. Hence, the customer may request a feature for one or more devices but need not be encumbered with the details as to bearer type or capabilities, thereby providing for an improved transparent interface to the customer. Likewise an end user may be notified or become aware of new or improved features, but that end user will not be encumbered with details pertaining to bearer type or capabilities. This is particularly advantageous in public safety type communications, where the end user is expected to remain focused on the public safety task at hand without distraction.

The data storage memory 104 receives and stores the customer order (referred to herein as the order) from the ordering system 102. The service management system 106 comprises a service management controller for processing the order stored in memory 104. The service management system 106, bearer management system 108, and the device/gateway management system 112 may be formed for example, of one or more local servers, distributed servers, and/or cloud based solutions, to name a few.

In accordance with some embodiments, the service management controller 106 analyzes the order and establishes the services comprising the features, bearer providers, and capabilities with which to provision the plurality of mobile communication devices 116 and configure the gateways 118 in response to the order comprising at least one or more of a device based subscription and/or user based subscription. For example, some order entry features may require the use of a particular bearer provider, and that bearer provider may need to be verified as having capacity to handle a particular number of devices with the requested features. As an additional example, some order entry features may require the use of an application gateway, and that application gateway may need to be verified as having capacity to process the data associated with the requested features. The service management system 106 provides the flexibility to determine that some features, such as a location feature (e.g. GPS), may be suited as a user based subscription for some customers, while better suited as a device based feature for other customers.

In accordance with some embodiments, the device/gateway management system 112 comprises a device management controller configured by the service management controller for provisioning and deploying the plurality of mobile communication devices 116, over the communications network 114 via one or more gateways 118. The gateways 118 may comprise application gateways configured for cloud-based access to the network 114 and/or access gateway configured for as land-based servers wired to the network 114. The configuration of gateway is determined by the service management system and configured by the device/gateway management system. The configuration of devices 116 and gateways 118 are stored in and can be retrieved from a data storage unit 113 associated with the device/gateway management system 112.

In accordance with some embodiments, the plurality of mobile communication devices 116 are deployed as converged devices, having at least one feature operable over narrowband LMR and at least one feature operable over broadband. The plurality of mobile communication devices 116 thus operate in accordance with the established features, established bearer providers, and established capabilities associated with their subscription orders. The billing service 120 automatically generates billing based on subscription order entries stored in the memory 104, wherein the billing is adjusted based on the type of features ordered, the type of bearer provider provided, and the capabilities of the bearer provider to handle the feature associated with the order entry. Changes to billing are automatically generated in response to subscription updates which may occur via order entry or in the field as a result of a predetermined trigger. Such triggers may occur as a result of an unforeseen event negatively impacting LMR narrowband operations, thereby necessitating a need to transition certain features and bearer providers to alternative features and bearer providers, over broadband frequency operation. For example, a PTT feature normally operating over LMR bearer provider may be automatically transitioned to a backup PTT feature over LTE bearer provider or a backup PTT over WiFi bearer provider, in the event that the LMR system has been negatively impacted by an event. When the LMR bearer provider becomes operational then the reverse transition can take place. The billing does not necessarily always require a fee, for example a customer may be provided with free access to alternative features or bearer providers for a predetermined time. Again, the selection of which alternative bearer provider for a particular feature is based on customer parameter needs, such as quality of service. For example, backup PTT over WiFi might be free (no fee) while backup PTT over LTE might have a fee (due to the higher quality of service typically associated with LTE as compared to WiFi). Hence, in accordance with some embodiments, the communication system is configured such that at least one subscription service is operable over narrowband LMR and at least one subscription service is operable over broadband, wherein the at least one subscription service operable over narrowband LMR is further configured for automatic transition to an alternative subscription service over broadband in response to a trigger indicative of the LMR narrowband becoming unavailable.

As mentioned previously, device based subscriptions are those which may be provisioned to an entire fleet of mobile communication devices. For example, a back-up PTT feature, device programming feature, additional over the air protocols and others known or yet to be developed. Device based subscriptions can be configured for pooled devices (shared by many users over different shifts) and thus all such provisioned devices will have access to those device based features. Device based subscriptions are particularly advantageous for mission critical type radio functions. Additionally, in accordance with the converged device operation of devices 116 within the communication system 100, the device based subscriptions can be used to provision mission critical services (and features within those services) with transferability capability from a primary narrowband LMR public safety bearer to an alternative broadband bearer, such as LTE, WiFi, Bluetooth, or 5G cellular to name a few. Billing by the billing service 120 of device based subscriptions is determined upon deployment and subsequently updated in response to device based subscription updates, changes/transfers or cancellations.

As mentioned previously, user based subscriptions are those which provide access and/or limit access to ordered services (and features within those services), to particular identified individuals as determined by the customer order. For example, user based subscriptions may comprise features such as a virtual assistant feature, location over broadband application, computer aided dispatch, messaging over broadband, video access and streaming and others known or yet to be developed. For example, the customer order may permit access to a feature to particular identified senior officer/users but not permitted access to the feature to lower ranked officers. Additionally, in accordance with the converged device operation of devices 116 within the communication system 100, the user based subscriptions can be used to provision mission critical features (such as computer aided dispatch or messaging) with transferability capability from a primary narrowband LMR public safety bearer to an alternative broadband bearer, such as LTE, WiFi, Bluetooth, or 5G cellular to name a few. Billing by the billing service 120 of user based subscriptions is determined upon deployment and subsequently updated in response to user based subscription updates, changes/transfers or cancellations.

Subscriptions, whether device based or user based, are actively managed by the service management system 106 to provide assignment of bearer providers 110, via bearer management system 108, based on different bearer provider capabilities and availability within the communication system 100. Capabilities associated with bearer providers 110 may include but are not be limited to, quality of service (QoS) of a current and alternative bearer provider, availability of a current and alternative bearer provider, duration of time anticipated for use of the current and alternative bearer provider, number of calls to be processed by the current and alternative bearer provider, data rate of the current and alternative bearer provider, and time duration of calls processed through the current and alternative bearer provider, to name a few. The billing service 120 is automatically updated based on initial subscription order, additional subscription order, renewal of a subscription order, cancellation of a subscription order, and transfer of a subscription service from one bearer provider to the alternative bearer provider which automatically adjusts the subscription order accordingly. The billing service 120 may also perform audits to ensure appropriate billing for the subscriptions services. Hence, the billing service 120 is responsive to dynamic changes that may take place within the communication system 100.

Hence, the service management controller of service management system selectively provisions the plurality of mobile communication devices 116, via the device gateway management system 112, to operate certain subscription services over a public safety, LMR narrowband bearer provider and other subscription services over a broadband bearer provider in response to various subscription orders. It is extremely advantageous that mission critical functionality be maintained for all devices within a fleet, particularly in the event that the LMR narrowband system (the primary system) becomes negatively impacted by some unforeseen event. The service management system 106 advantageously manages the selection of current and alternative bearer provider(s), via bearer management system 108, that can handle such mission critical features based on the aforementioned bearer provider capabilities. Once bearer providers are selected for those mission critical features, the service management system 106 configures the device/gateway management system 112 to provision the devices 116 and/or configure the gateways 114 accordingly. Again, the subscription based deployment and management advantageously remain transparent to a customer as well as the end user utilizing the managed device and managed gateways.

FIG. 2 is an example table 200 summarizing subscription features for the communication system 100 of FIG. 1 in accordance with some embodiments. Referring to both FIGS. 1 and 2, able 200 is used to illustrate the flexibility of the service management system 106 controlling, via its service management controller, the subscription based deployment and management of mobile communication devices 116 within the communication system 100.

Column 202 identifies an incoming service subscription order including a feature request, wherein the feature request is one of a device based feature and/or a user based feature. Columns 204 identify feature association as being device specific or user specific. For example, device specific features may comprise, device programming, provisioning management, such as fleet provisioning, back-up PTT, and additional communication protocols, and other device specific features known or yet to be developed.

Referring again to column 204, features associated with a particular user which leverage user context, user specific preferences, or multi-device available are deemed to be user-specific features. For example, user specific features may comprise a virtual assistant, messaging, and location (GPS) and others known or yet to be developed.

At columns 206, the subscription may be part of a new device order, a request to add a new feature to an existing device in the field, or a request to renew an already existing feature subscription which is about to expire or has expired, thereby providing for a very flexible subscription process managed by the service management controller 106. Such orders may be dependent on the device, where a customer associates with the device, for example individual issued device, location deployed device, or device associated with a purpose designed vehicle. Or, the order may be independent of the device, where the customer associates with a user, for example supervisor with clearance for computer aided dispatch assignments, investigator with a role requirement for messaging, and role assignment requirements. For the purposes of this application the customer and the user are considered different entities. For example, a customer may be a county Sheriff's Department, and field user(s) may be particular sheriff officers within that sheriff department, identified, for example, by rank or position (e.g. Chief of Police, detective, etc.) or name (e.g. Sheriff Deputy John Doe).

Column 208 shows that the subscriptions, whether device based or user based, may have a criteria based expiration associated therewith. Subscription lengths can be bound by associated expirations having different measurements including time duration, termination date, data usage, cycle usage, and additional measurable parameters. The subscriptions may be, for example time-bound, for example one to two years, and are non-transferable to other non-subscribing devices.

Table 2 illustrates the flexibility in the management of subscription processing. For example, service management system 106, via its service management controller, may operate using predetermined criteria, such as which bearer provider 110 has been identified as having capacity to provide a requested feature. Predetermined quality of service levels may be offered by certain bearer providers for certain features. For example, a subscription offering may comprise a feature at two different price levels, wherein the higher priced feature is provided by an LTE bearer operating at a higher quality of service level than, for example, that same feature being offered by a less costly bearer provider, such as Wi-Fi with a lower quality of service level. The service management system 106 automatically manages the selection of bearer provider based on the customers' requirements as determined by the customer order. The service management is seamless to the end user of the ultimately deployed and maintained device.

Subsequent to deployment, devices 116 may be reconfigured or updated based on predetermined triggers, such as in the event that the LMR narrowband system (the primary system) becomes negatively impacted by some unforeseen event. Such updates may be approved or denied based on parameters set by the initial customer order. Thus, only features which are deployed are usable and charged a subscription fee. Additional or reconfigured features may happen in the field, in response to event triggers, such as loss of LMR bearer provider. In such an example, the customer can order additional Back up PTT feature for fielded devices, the service management system 106 will verify capacity to authorize the new subscription request. The service management system 116 determines if the request can be granted and subscription adjusted accordingly for the new feature and cost associated therewith. Thus, a mobile communication device in the field can be updated with a new feature if the device, available gateway, and available bearers have the ability to support the new addition. If such provisioning is not available due to access, application, or bearer capabilities, then the service management controller evaluates the subscription offerings and evaluates the changes to the subscription for this new request. If approved, the service management controller reconfigures access, application, bearer, and device with the updated feature in the field.

The ability for a customer to save cost for an across the board offering is highly advantageous. For example, LTE service may only be activated in devices with subscriptions that include features that require LTE bearer support. The ability to provide automatic service transitions triggered by an unforeseen event may be offered, deployed, and managed for free, lower fees, or higher fees for the duration of the event, or for some other predetermined amount of time. For example, fees for PTT over LMR can be adjusted when transitioned to backup PTT over LTE.

Figure 3:
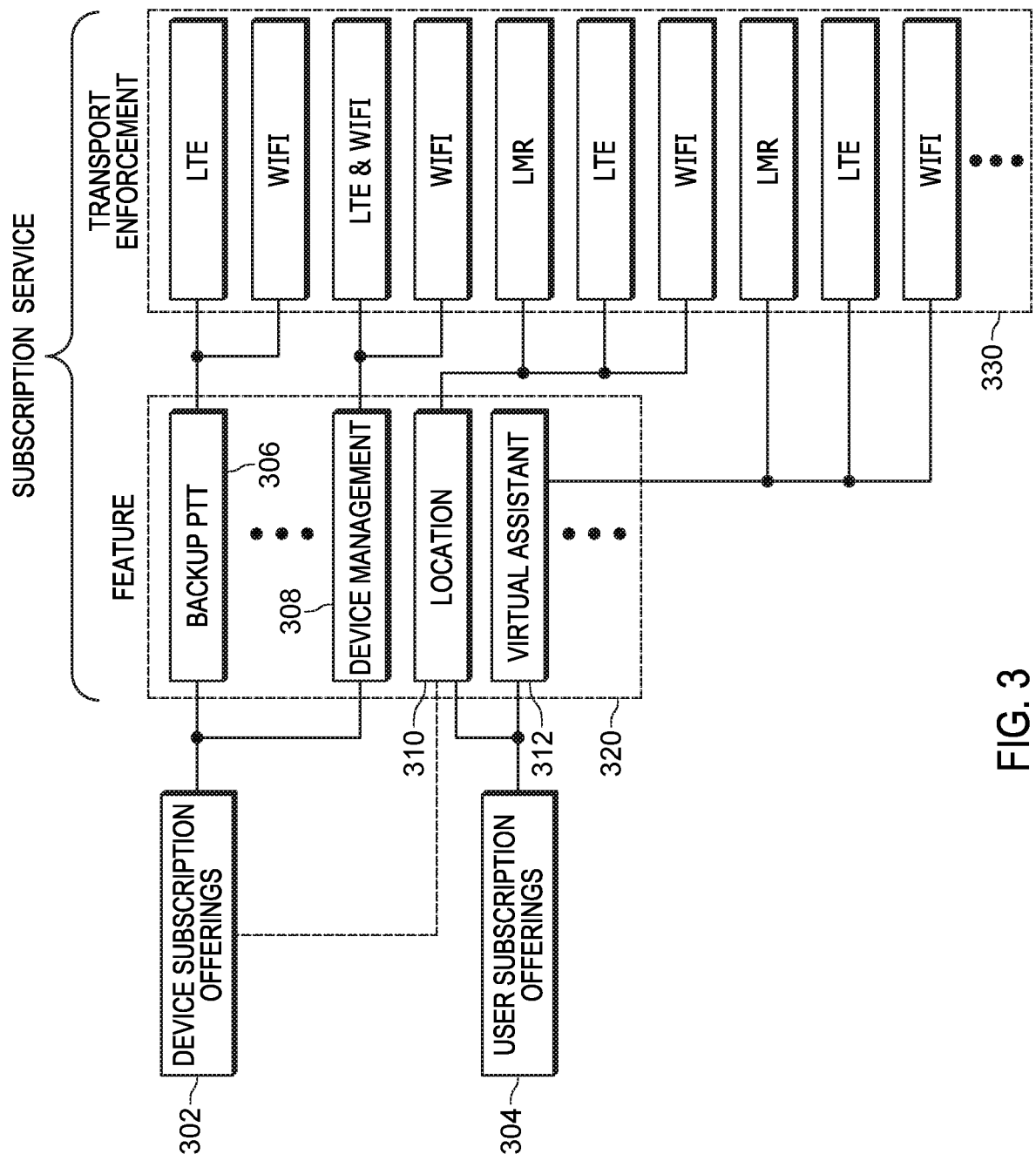
FIG. 3 is block diagram of example subscription offerings along with example features and example transports for those features as provided by the subscription based communication system of FIG. 1 in accordance with some embodiments.

FIG. 3 is block diagram of subscription offerings along with example features and example transport for those features as provided by the subscription based communication system 100 of FIG. 1 in accordance with some embodiments. Referring to both FIGS. 1 and 3, the subscription offerings may be device subscription offerings 302 and/or user subscription offerings 304. The device subscription offerings 302 and user subscription offerings 304 provide for a plurality selectable features 320 tailored for that customer's requirements, and from which the customer may order. Appropriate transport 330 for each selectable feature 320 is provisioned based the capabilities associated with devices and bearer providers within the communication system 100, as managed by the controller of service management system 106. Capabilities associated with bearer providers may include but are not be limited to, quality of service (QoS), bearer availability, anticipated duration of time for use of the feature, data rate of bearer provider, to name a few.

Device subscription offerings 302 provide a plurality of selectable features associated with a device, such as a backup PTT feature 306, a device management feature 308, and others known or yet to be developed. User subscription offerings 304 provide a plurality of selectable features, such as 310 and virtual assistant 312, and others known or yet to be developed.

The subscription offerings 302, 304 offered for sale define features, bearer type, and capabilities needed for the device and gateway. As mentioned earlier, the bearer type, and capabilities advantageously remain transparent to the customer and the end user. The service management controller of service management system 106 of FIG. 1 provisions the devices 116 and configures the gateways 118, based on the features, bearer providers, and capabilities and may further enable new gateways and bearer services, if needed, based upon availability and capability requirements. As an example, a device subscription offering 302 of backup PTT feature 306 enables a device to automatically communicate via a specific protocol over a broadband bearer in the field in response to a trigger event, such as loss of LMR, thereby transferring the transport of mission critical features, from an LMR bearer provider to alternative transport system, such as WiFi 316 or LTE 318. Devices enabled with backup PTT over, for example, WiFi will only pay for subscriptions rates for the WiFi service, while those systems or devices operating backup PTT over LTE will pay for subscriptions at a higher subscription rate due to the higher quality of service.

As another example, a user subscription offering 304 of a location feature 310 and virtual assistant feature 312 may be transported over narrowband LMR or over a broadband transport system, such as LTE or WiFi, or other transport system. The service management system 106 provides the flexibility to determine that some features, such as a location feature (e.g. GPS), may be suited as a user based subscription offering 304 for some customers, while better suited as a device based subscription offering 302 for other customers. As part of the user subscription offerings 304, the location feature 310 and/or virtual assistant feature 312 is/are configurable for capable devices over selected bearer providers. For example, a virtual assistant feature may be operated on some devices over LTE, while the virtual assistant feature may be operated on a different device over WiFi, the devices being within the same communication system 100. Hence, user subscriptions can be tailored for individuals requiring different levels of service within a given feature. For example, senior ranking officers or officers identified by name may have devices configured with voice and data location services, operating over LTE, while other police officers, within the same department, may only require data location services, configured over WiFi. Remote support from the service management system 106 may be offered for acceptable LTE and/or WiFi or other non-LMR transports. Users with a single device enabled with, for example, virtual assistant will only pay a specific subscription rate, while users with multiple features will pay for subscriptions at a higher subscription rate due to the higher capacity of service.

Figure 4:
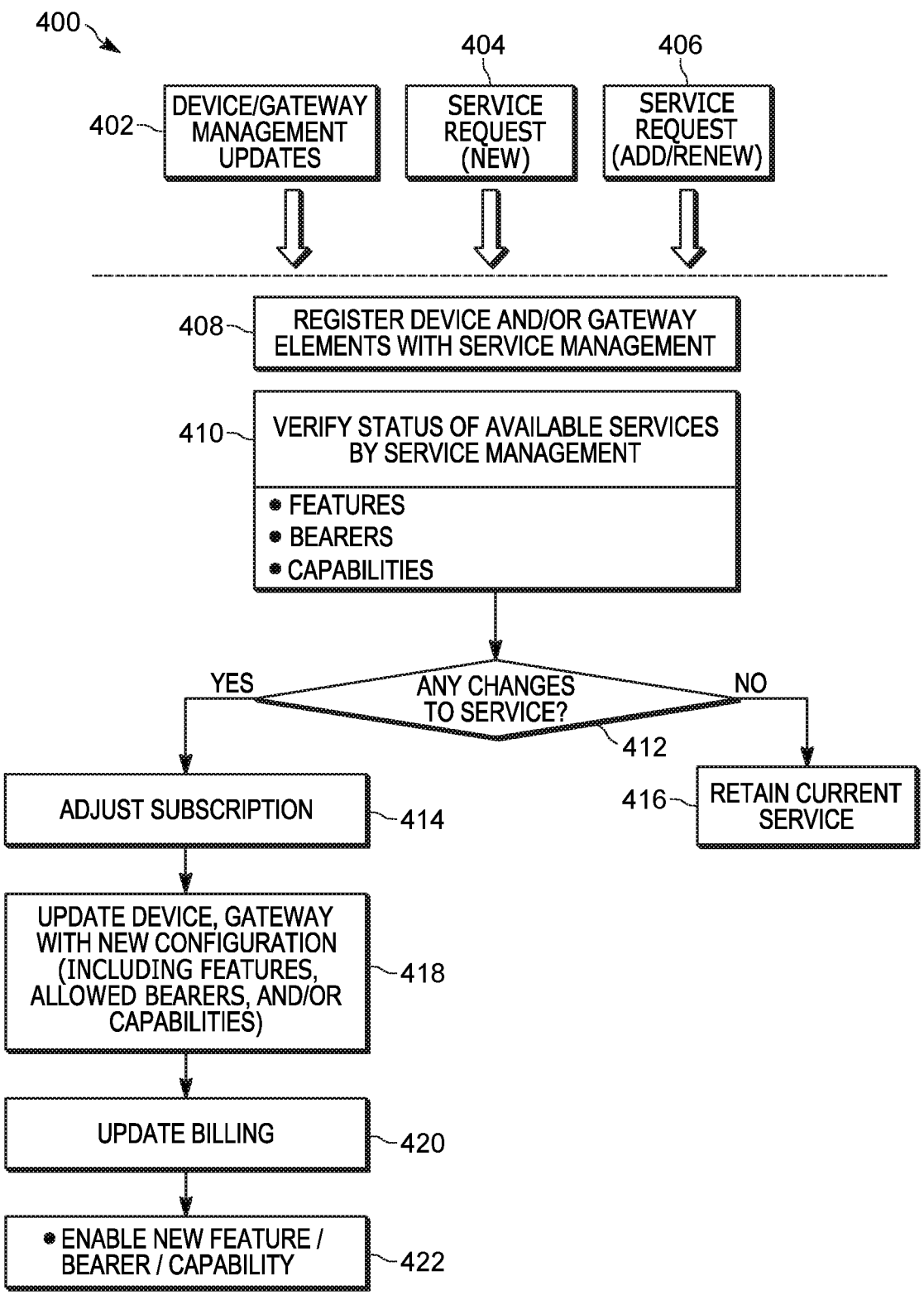
FIG. 4 is a flowchart of a method for deploying and managing services on a communication system formed and operating in accordance with some embodiments.

FIG. 4 is a flowchart of a method 400 for deploying and managing a communication system formed and operating in accordance with some embodiments. At least one of: a device management update 402, a new service request 404 and/or a service update request 406 is/are entered into the order system 102 of FIG. 1. Referring to both FIGS. 1 and 4, in response to the entry, registration takes place at 408, by the service management controller of service management 106, where one or more device(s) and/or suitable gateway(s) register with the service management system 106. For example, for a new device being deployed 402, the service management system, at 408, registers the device and registers one or more gateways (wired access gateway and/or cloud based applications gateway), suitable for the new device and requested features or services associated with that new device. As another example, requests for new service(s) offerings 404 to be added to the order system causes the management system to register, at 408, one or more gateways (wired access gateway and/or cloud based applications gateway) suitable for transport of the new service offering. As another example, for a service update 406 to an already deployed device, the service management system registers, at 408, one or more gateways (wired access gateway and/or cloud based applications gateway) suitable for updating a feature to the already deployed device.

Subsequent to registration at 408, verification is made at 410 by the controller of service management system 106 as to the status of available services. Service management system 106 is used to manage services which comprise features, bearer providers, and capabilities within communication system 100.

A check is made at 412, to determine if any change to service has been triggered. If no change in service has been triggered at 412, then current service is retained at 416. Adjustment to subscription takes place at 414, in response to the service management system informing the billing service of changes in services. Triggers that may result in a change of service may comprise for example a change in one or more of features, bearers, and/or capabilities associated with the communication system 100.

A 'feature trigger' causing a change in service may be, for example, a request to update the configuration of at least one device within the communication system with one or more features (or the removal of one or more features), such as back-up PTT, device management, location services, and/or virtual assistant services, as well as different provisioning within those features, such as location services being changed for voice and data, voice only, and/or data only.

A 'bearer provider trigger' causing a change in service may occur, for example, as a result of a bearer provider becoming unavailable triggering transfer to another bearer provider. For example, an LMR bearer provider becoming unavailable results in the transfer of one or more mission critical functions of a device to an alternative bearer provider for transport, such as LTE or WiFi.

A 'capability trigger' causing a change in service may occur, for example, as a result of a change in capabilities that impact a feature and/or bearer provider. For example, a bearer provider lacking the capacity to handle a new feature associated with a new order or update, or lacking capacity to handle a new device, may trigger a change in service, such as a transferring to a new bearer provider.

If a service change has been triggered at 412, then adjustment to subscriptions are made at 414 followed by the update to the device and/or reconfiguration of the gateways (wired access gateway and/or cloud based applications gateway) at 418. These updates may include changes to features, bearers, and/or capabilities. Adjustments to the billing service are made at 420 in accordance with the adjusted subscription at 422.

New feature, bearer, and/or capability is/are then enabled at 422. Accordingly, the service management system operates as a hub to facilitate the deployment of devices, as well as the subsequent management of those devices within a communication system 100.

Figure 5:
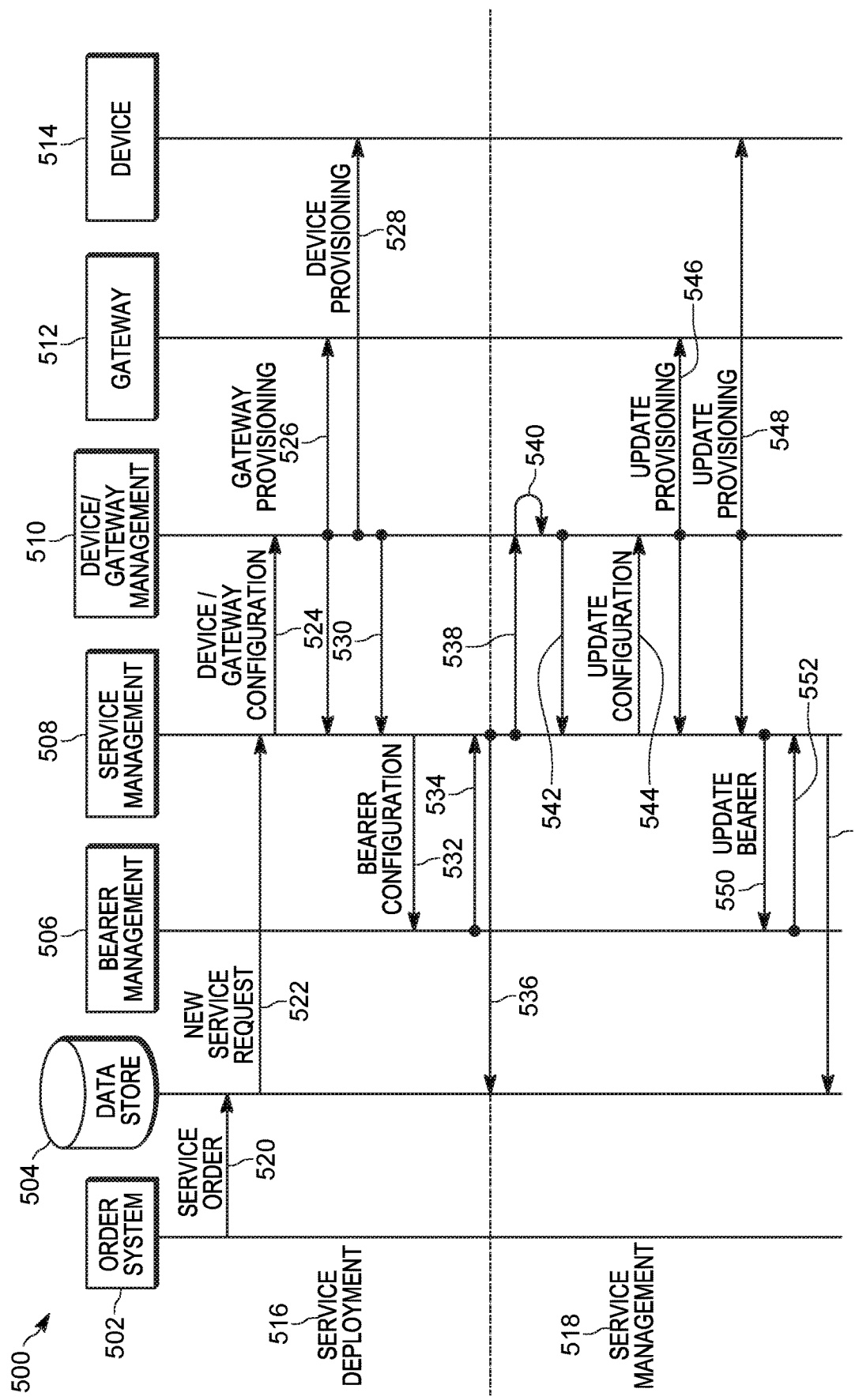
FIG. 5 is sequence diagram for the communication system of FIG. 1 formed and operating in accordance with some embodiments Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

FIG. 5 is sequence diagram 500 for the communication system of FIG. 1 formed and operating in accordance with some embodiments. Referring to both FIGS. 1 and 5, the sequence diagram 500 is described in terms of an ordering system 502 (similar to order system 102), a data storage unit 504 (similar to data storage unit 104), a bearer management system 506 (similar bearer management system 108), a service management system 508 (similar to service management system 106), a device/gateway management system 510 (similar to device/gateway management system 112), one or more gateways 512 (similar to the one or more gateways 118), and one or more devices 514 (similar to the one or more devices 116 of FIG. 1). Another data storage unit, not shown but similar to data storage unit 113 of FIG. 1, is understood to be associated with the device/gateway management system 510. Service deployment 516 is illustrated in the upper portion of the sequence diagram 500, and service management 518 is illustrated in the lower portion of the sequence diagram.

Deployment

Starting at order system 502, a service order 520 comes in from customer and gets stored in data storage unit 504. A new service request is generated at 522, based upon the subscription offering (similar to subscription offerings 103). The service management system 508 takes the service request and generates new device/gateway configuration information at 524 which is provided to the device gateway management system 510. The device gateway management system 510 provides gateway provisioning at 526 and device provision at 528. An alert is sent to the service management system 508 when provisioning is completed at 530. The service management system 508 initiates bearer configuration at 532, and acknowledgement at 534 of the configuration from the bearer management system 506 back to service management system 508. The service management system 508 then updates the data storage 504 with the resultant of verification at 536.

Management

Once devices and gateways have been deployed, the service management system 508 begins monitoring and managing the communication system, as there may be a need to update or change an existing service. The service management system 508 sends out a verification request at 538 to the device/gateway management system 510. The device/gateway management system 510 determines current status 540 from its associated storage unit (not shown). At 542, the device/gateway management system 510 notifies at 542 the service management system 508 with the verification status.

The service management system 508 identifies the needed configuration updates or changes and transmits those configuration updates or changes to the device/gateway management system at 544. The gateway side of device/gateway management system 510 updates the gateway provisioning details and notifies the service management system 508 and gateway 512 of gateway updates at 546. The device side of device/gateway management system 510 updates the device provisioning details and notifies the service management system 508 and device 514 of the device updates at 548.

The service management system 508 identifies configuration updates or changes to the gateway and/or device and transmits those configuration changes or updates to the bearer management system at 550. The bearer management system notifies the service management system 508 of updates or changes at 552. The service management system 508 then updates the data storage 504 with service management updates associated with updates or changes made to any of the device, gateway, and bearer at 554.

In the sequencing diagram 500, verification of the bearer is advantageously not required because that service is already being paid for (already part of the billing) as it is not a shared element. Any changes to the bearer will be reflected in the data store 504 based on preexisting orders.

Accordingly, there has been provided a system and method of subscription based deployment and management of a communication system. The subscription offerings are advantageously configured for optimized services for public safety customers upon deployment and billed accordingly. The subscription services deployed to mobile communication devices and gateways are further beneficially updatable in the field, and subscription billing adjusted accordingly, while remaining transparent to the public safety end user. The management and control of subscription services by the service management system facilitates the convergence of narrowband public safety communications and broadband communications in a mobile communication device as well as fleet management of those devices a part of a communication system, even under varying changes to operating conditions within the system, such as an unforeseen event impacting operation of mission critical services triggering a change to an alternative service provider for predetermined mission critical features.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A communication system, comprising:
    a plurality of mobile communication devices;
    a service management system establishing subscription services for the plurality of mobile communication devices, at least one subscription service being operable over narrowband land mobile radio (LMR) and at least one subscription service being operable over broadband, wherein the at least one subscription service operable over narrowband LMR is configured for automatic transition to an alternative subscription service over broadband in response to a trigger indicative of the LMR narrowband becoming unavailable;
    a billing service for generating billing based on the at least one subscription service operable over narrowband LMR and the at least one subscription service operable over broadband, and the billing service being automatically updated in response to the trigger and automatic transition from subscription service over narrowband LMR to the alternative subscription service over broadband; and
    wherein the billing service is automatically updated based on initial subscription order, additional subscription order, renewal of a subscription order, cancellation of a subscription order, and transfer of the subscription service from one bearer provider to an alternative bearer provider.

2. The communication system of claim 1, wherein the billing service selectively generates fee billing or non-fee billing based subscription service type.

3. The communication system of claim 1, wherein the subscription services comprise:
    features;
    bearer providers; and
    capabilities.

4. The communication system of claim 3, wherein:
    the features are associated with a mobile communication device or an end user,
    the bearer providers are associated with the communication system; and
    the capabilities are associated with measurable parameters of the bearer provider.

5. The communication system of claim 3, wherein the billing service automatically updates based on one or more of: updates in features, updates in bearer providers, and updates in capabilities.

6. The communication system of claim 3, wherein the bearer providers and capabilities are transparent to an end user.

7. The communication system of claim 1, wherein the at least one subscription service comprises a device subscription service for a backup PTT feature operable over narrowband LMR configured for automatic transition to the alternative subscription service over broadband in response to the trigger indicative of the LMR narrowband becoming unavailable.

8. A method of configuring a billing service for a communication system of converged mobile communication devices operable over narrowband land mobile radio (LMR) and broadband, comprising:
    generating billing, by a billing service, based on at least one subscription service operable over narrowband LMR and at least one subscription service operable over broadband, wherein the at least one subscription service operable over narrowband LMR is further configured for automatic transition to an alternative subscription service over broadband in response to a trigger indicative of the LMR narrowband becoming unavailable;
    automatically updating the billing in response to the trigger and automatic transition from the subscription service over narrowband LMR to the alternative subscription service over broadband; and
    wherein the billing service is automatically updated based on initial subscription order, additional subscription order, renewal of a subscription order, cancellation of a subscription order, and transfer of the subscription service from one bearer provider to an alternative bearer provider.

9. The method of claim 8, wherein the billing service selectively generates fee billing or non-fee billing based subscription service type.

10. The method of claim 8, wherein the subscription services comprise:
    features;
    bearer providers; and
    capabilities.

11. The method of claim 10, wherein:
    the features are associated with a mobile communication device or an end user,
    the bearer providers are associated with the communication system; and
    the capabilities are associated with measurable parameters of the bearer provider.

12. The method of claim 10, wherein the billing service automatically updates based on one or more of: updates in features, updates in bearer providers, and updates in capabilities.

13. The method of claim 10, wherein the bearer providers and capabilities are transparent to an end user.

14. The method of claim 8, wherein the at least one subscription service comprises a device subscription service for a backup PTT feature operable over narrowband LMR configured for automatic transition to the alternative subscription service over broadband in response to the trigger indicative of the LMR narrowband becoming unavailable.

15. A communication system, comprising:
    a plurality of mobile communication devices configured and deployed as converged devices having a subscription service operable over narrowband land mobile radio (LMR) and operable over broadband;
    a billing service adjusted in accordance with deployment and management of the plurality of mobile communication devices, including automatic billing adjustment based on a trigger indicative of automatic transfer of mission critical functions from narrowband bearer providers to broadband bearer providers; and
    wherein the billing service is automatically updated based on initial subscription order, additional subscription order, renewal of a subscription order, cancellation of a subscription order, and transfer of the subscription service from one bearer provider to an alternative bearer provider.

16. The communication system of claim 15, wherein the narrowband bearer providers and broadband bearer providers are transparent to an end user.

17. The communication system of claim 15, wherein the at least one subscription service comprises a device subscription service for a backup PTT feature operable over narrowband LMR configured for automatic transition to the alternative subscription service over broadband in response to the trigger indicative of the LMR narrowband becoming unavailable.

\* \* \* \* \*